(12) United States Patent
Weickert et al.

(10) Patent No.: US 7,539,095 B2
(45) Date of Patent: May 26, 2009

(54) SELECTION DEVICE FOR READING AND/OR RECORDING DEVICES FOR INSCRIBABLE DIGITAL VERSATILE DISKS (DVD)

(75) Inventors: Roland Weickert, Stutensee (DE); Reiner Kopf, Straubenhardt (DE)

(73) Assignee: Nero AG (DE)

( * ) Notice: Subject to any disclaimer, the term of this patent is extended or adjusted under 35 U.S.C. 154(b) by 182 days.

(21) Appl. No.: 10/443,728

(22) Filed: May 19, 2003

(65) Prior Publication Data
US 2006/0245740 A1 Nov. 2, 2006

(30) Foreign Application Priority Data
May 17, 2002 (DE) ................. 102 23 080

(51) Int. Cl.
*G11B 7/00* (2006.01)
(52) U.S. Cl. .................. 369/47.13; 386/45; 386/68; 386/69; 386/70; 386/125; 386/126; 369/59.25
(58) Field of Classification Search ............. 386/45, 386/68, 69, 70, 125, 126; 369/59, 27.01, 369/30.01, 59.25, 275.3
See application file for complete search history.

(56) References Cited

U.S. PATENT DOCUMENTS

| 5,687,160 | A  | * | 11/1997 | Aotake et al. | ............ | 369/275.3 |
| 5,691,972 | A  | * | 11/1997 | Tsuga et al. | ............. | 369/275.3 |
| 5,825,726 | A  | * | 10/1998 | Hwang et al. | ............ | 369/30.05 |
| 6,510,127 | B1 | * | 1/2003 | Kim | ........................ | 369/275.2 |
| 6,631,107 | B1 | * | 10/2003 | Ito et al. | ..................... | 369/53.2 |
| 7,106,674 | B2 | * | 9/2006 | Harigae et al. | .......... | 369/47.54 |
| 2001/0020958 | A1 | * | 9/2001 | Yoo et al. | ................... | 345/818 |
| 2002/0126552 | A1 | * | 9/2002 | Jeong | ....................... | 365/200 |
| 2002/0181376 | A1 | * | 12/2002 | Acker | ...................... | 369/59.25 |
| 2003/0133369 | A1 | * | 7/2003 | Sasaki | ..................... | 369/30.11 |
| 2003/0133699 | A1 | * | 7/2003 | Ando et al. | .................. | 386/95 |

(Continued)

FOREIGN PATENT DOCUMENTS

EP 0724263 7/1996

(Continued)

OTHER PUBLICATIONS

Machine Translation of Japaness Publication No. 10134483 by Kusakari Akira in Oct. 31, 1996.*

*Primary Examiner*—Wayne R Young
*Assistant Examiner*—Linh T Nguyen
(74) *Attorney, Agent, or Firm*—Robert W. Becker; Robert W. Becker & Assoc.

(57) ABSTRACT

A selection device for a reading and/or writing device for a rewritable Digital Versatile Disk (DVD) includes a selector for selecting a specified complete and limited data area of a plurality of such data areas present on the DVD after a Lead-in Area, and a representer for representing the selected data area to the operating system of a data processing unit, which can only access to a first or a single data area on the DVD as this single or only data area. By transferring a start address of the first or only single data area, which the operating system can access, into a start address of the selected data area, an inquiry of the operating system to the first or single data area is diverted to the selected data area.

12 Claims, 3 Drawing Sheets

U.S. PATENT DOCUMENTS

2003/0147323 A1* 8/2003 Sako et al. ............... 369/53.22
2004/0071062 A1* 4/2004 Harigae et al. ........... 369/47.54
2005/0111829 A1* 5/2005 Ito et al. ....................... 386/69

FOREIGN PATENT DOCUMENTS

| | | |
|---|---|---|
| EP | 1113442 | 7/2001 |
| EP | 1178470 | 2/2002 |
| JP | 10134483 | 5/1998 |
| JP | 2001184666 | 7/2001 |

* cited by examiner

SELECTION DEVICE FOR READING AND/OR RECORDING DEVICES FOR INSCRIBABLE DIGITAL VERSATILE DISKS (DVD)

BACKGROUND OF THE INVENTION

The invention relates to selection devices for reading and/or recording devices for inscribable Digital Versatile Disks (DVD) that are connected with data processing units having at least one operating system which can access only a fixed data area that is limited by Lead-In and Lead-Out and that also does not change.

Known reading and/or recording devices for inscribable Digital Versatile Disks (DVD)—subsequently merely called DVD—are characterized in particular in that with an operating system in a data processing unit, only those data areas can be read that are limited by Lead-In and a terminating area which could be Lead-Out. A further recording after the Lead-Out is not possible. In particular for data areas having small data quantities, this is minimally effective. The full capacity of a recordable DVD can therefore not be fully utilized. A non-recorded area after the Lead-Out cannot be used.

SUMMARY OF THE INVENTION

The problem that is the basis of the present invention is to also read areas of recordable Digital Versatile Disks (DVD) after a terminating area as Lead-Out with an operating system. This problem is solved with the features, for the inventive selection device, of a first device that during operation of a Digital Versatile Disk (DVD) freely selects a characteristic, complete and limited data area of data areas of the Digital Versatile Disk that are present after a Lead-In and are limited, and of a second device that represents such limited data area that is freely selected during operation of a Digital Versatile Disk as a first or only data area for the at least one operating system, wherein the first and second devices are interconnected.

The selection devices for reading and/or recording devices for inscribable Digital Versatile Disks (DVD)—subsequently merely called DVD—are characterized in particular in that with operating systems in data processing units, via which otherwise only those data areas that are limited by Lead-In and Lead-Out are readable, data areas limited after the Lead-In can be selectively read and/or further inscribed.

The user can thereby freely access different data areas that the user has previously communicated 20 to the selection device. That eliminates the drawback that the operating system can access only a fixed, generally the first or the last, data area.

Inscribable DVDs are generally used to store and reproduce large quantities of data or audio/video material thereon. With this use, DVDs are inscribed one time and no further data is added. In contrast to the compact disc (CD), only one Lead-In and one Lead-Out are found on a DVD. As soon as the Lead-Out was recorded, the DVD is closed and no further data (sessions) can be attached. However, with today's DVD recorders there is the possibility, as with CD–R/RW, after a successfully closed recording process (session with media-specific limitations of the session) to add recordable further data to a DVD at a later point in time. The thus-produced DVD therefore contains a plurality of sessions (multi-sessions) having media-specific limitations that individually contain the user data and the administration information for the user data (file system).

A selective access to the thus-produced DVD sessions with the media-specific limitations is not supported by various operating systems. For example, with some operating systems, when a so-called multi-session DVD is loaded, only the first session is indicated, in other words, later added data cannot be accessed, merely the data which at the first time was recordably inscribed upon the DVD. In contrast, other operating systems always indicate only the last session, and also do not allow a freely selectable access.

With the inventive selection device, this drawback is advantageously eliminated, whereby it is possible to freely selectively access every session of a so-called multi-session DVD in order thereby to reach all data on the DVD. In so doing, it is also possible to take into consideration the special structure of the various DVD recordable types (DVD+R/RW, DVD–R/RW). The inventive selection device for reading and/or recording devices for inscribable Digital Versatile Disks (DVD) is accordingly suitable for data processing units having at least one operating system, whereby the data processing unit with the operating system can access only a fixed data area that is limited by Lead-In and Lead-Out and that also does not change.

For this purpose, in a first device a characteristic, complete and limited data area of data areas of the DVD that are present and limited after the Lead-In is freely selected during the operation of the DVD, and in a second device this data area, which is freely selected and limited during the operation of the DVD, is represented as the first or the only data area for the operating system. This is of particular significance for inscribable DVDs that in a chronologically interrupted manner are successively inscribed with limited data areas up to the close of the DVD. The close is effected with the Lead-Out. New data areas of a not yet completely inscribed DVD are added after the last data area, whereby advantageously already inscribed data areas can be individually extracted and read, even independently of the close by the Lead-Out.

A further important advantage for the user is that the entire capacity of an inscribable DVD can be utilized without having to inscribe the entire DVD during a single recording process. Otherwise, the non-inscribed area would not be usable, since it is not accessible in a manner permitting reading, even if it was inscribed in a later recording process. Even the transmission of the entire content of the DVD to the data processing unit, e.g. a hard drive, would not resolve the problem.

A first device, which selects a data area, which is characterized by Border-In/Border-Out, is complete and is limited, of data areas of the DVD present after the Lead-In during the operation of the DVD, and a second device that represents this data area, which is freely selected during operation of the DVD and is limited by Border-In/Border-Out as the first or the only data area for the operating system, pursuant to the further development result in the selection device being usable for DVD Recordable that have also not yet been closed by Lead-Out. In so doing, these data areas can be read independently of one another. Further new data areas are added after the last data area until the available storage volume of the DVD Recordable is closed.

A first device, which freely selects a data area, which is characterized by Border-in/Border-Out, is complete and is limited, of the data areas of the DVD present between the Lead-In and the Lead-Out and limited by Border-In/Border-Out during the operation of the DVD, and a second device, which represents this data area that is freely selected during the operation of the DVD and is limited by Border-In and Border-Out as the first or the only data area for the operating system, pursuant to further development lead to the readability of individual data areas, which are also freely selectable by the user, and are of a DVD–R/RW limited by Lead-In and Lead-Out. This prevents that only the first or the last data area can be determined as the only data area for the operating system.

A first device that freely selects a data area, which is characterized by Lead-In/Closure or Intro/Closure, is complete and is limited, of the limited data areas of the DVD present after the Lead-In, during the operation of the DVD, and a second device which represents this data area, which is selected during the operation of the DVD and is limited by Lead-In/closure or Intro/Closure, as the first or the only data area for the operating system, pursuant to a further development result in the selection device being usable for DVD+R's that are not yet closed by Lead-Out. New data areas can be added to the last present data area until the available storage volume of the DVD+R is fully utilized.

A first device, which freely selects a data area, which is characterized by Lead-In/Closure, Intro/Closure or Intro/Lead-Out, is complete and is limited, of the data areas of the DVD present after the Lead-In and limited, during the operation of the DVD, and a second device, which represents this data area, which is freely selected during the operation of the DVD and is limited by Lead-In/Closure, Intro/Closure or Intro/Lead-Out, as the first or the only data area for the operating system, pursuant to a further development lead to a readability of individual data areas, which are freely selectable by the user, of a DVD+R limited by Lead-In and Lead-Out. This prevents that only the first or the last data area can be determined as the only data area for the operating system.

Concerning the transfer of the start address of the only data area selectable for the operating system to the start address of an arbitrary data area that is freely selectable by the user, pursuant to a further development there exists for the user the possibility of utilizing the full capacity of an inscribable DVD without having to inscribe the entire DVD during a single recording process. The non-inscribed area would otherwise not be usable, since it is not accessible in a readable manner, even if it was inscribed in a further recording process. The problem is also not resolved by transferring the entire content of the DVD to, for example, a hard drive of the data processing unit. This can be effected in a user-friendly manner via appropriate representations and a menu control to a display unit, for example, as a display. In this way, the user is furthermore in the position to also select a desired data area on the DVD for utilization without having to transfer the content of the entire DVD to the data processing unit, so that considerably less storage volume is required.

Further developments result in the user obtaining a possibility of determining the data areas of the DVD. The at least one freely determinable character, or the freely selectable name, advantageously leads to a contents register of the data areas present upon the DVD. At the same time, there results for the user the possibility of easily and rapidly again finding non-complete DVDs, since the user need only call up the contents register and not the content of the already present data areas.

DETAILED DESCRIPTION OF THE PREFERRED EMBODIMENTS

An embodiment of the invention will be described in greater detail in the following.

A selection device for reading and/or recording devices for inscribable DVDs 10, which are connected with data processing units 16 having at least one operating system, which can access only a fixed data area that is limited by Lead-In and Lead-Out and also does not change, essentially comprises a first device 12 that during the operation of the DVD freely selects a characteristic, complete and limited data area of data areas of the DVD that are present after the Lead-In and are limited, and a second device 14 that represents this limited data area that is freely selected during the operation of the DVD as the first or the only data area for the operating system. The devices are components of a recording and/or reading device for inscribable DVD's. In this connection, inscribable DVDs are not only DVD–R/RW but also DVD+R (with R standing for Recordable and RW standing for ReWritable).

In a DVD–R/RW, the data area is a component of a so-called "Border". A Border contains at least one Border-In, the data area with the user data, and a Border-Out. After the last Border-Out, the closed DVD–R additionally contains a Lead-Out. A DVD-R/RW is characterized as "Closed" as soon as it obtains a Lead-Out.

Figure 1A:
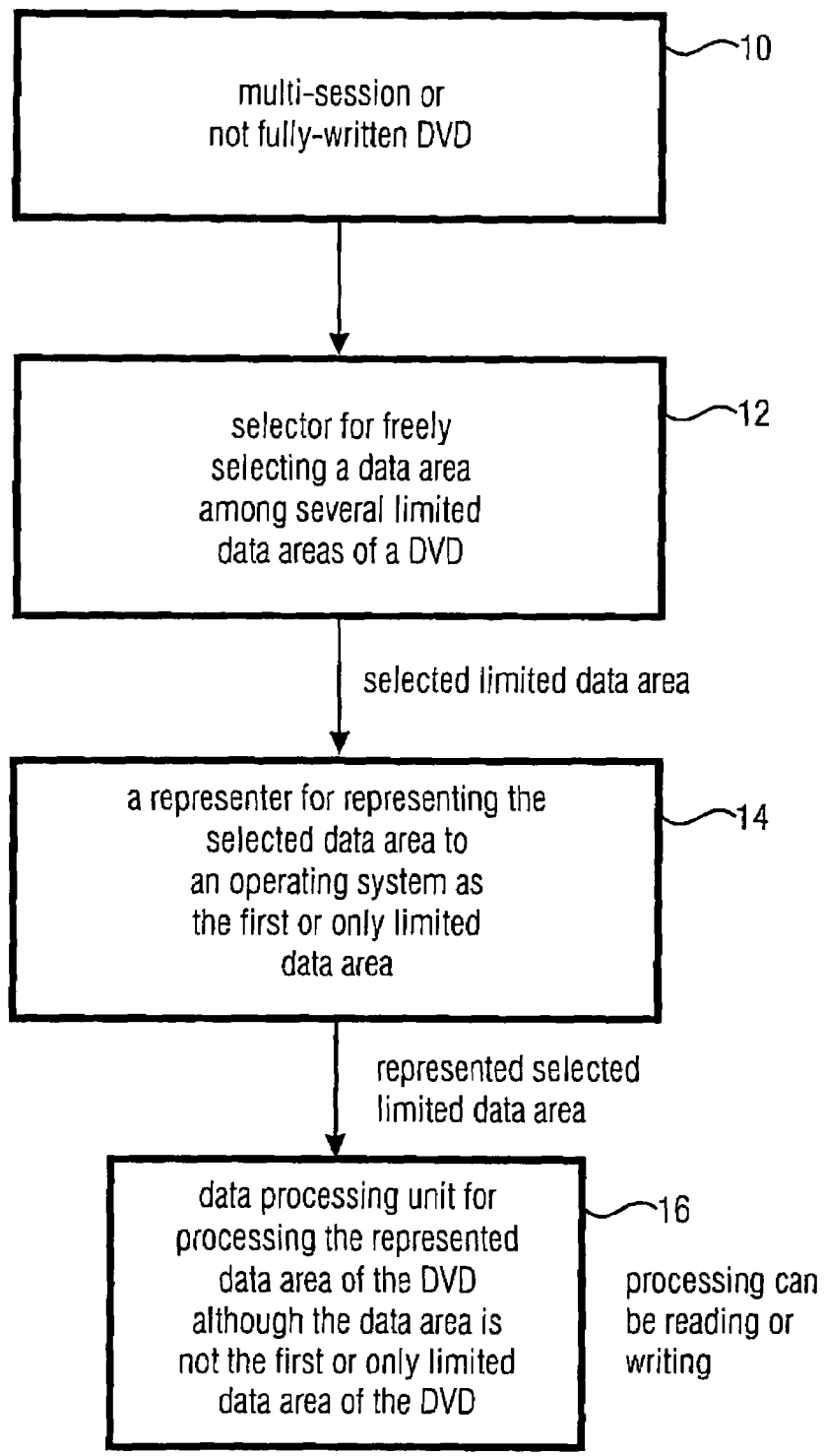
FIG. 1a shows a preferred embodiment of a selection device.
Figure 1B:
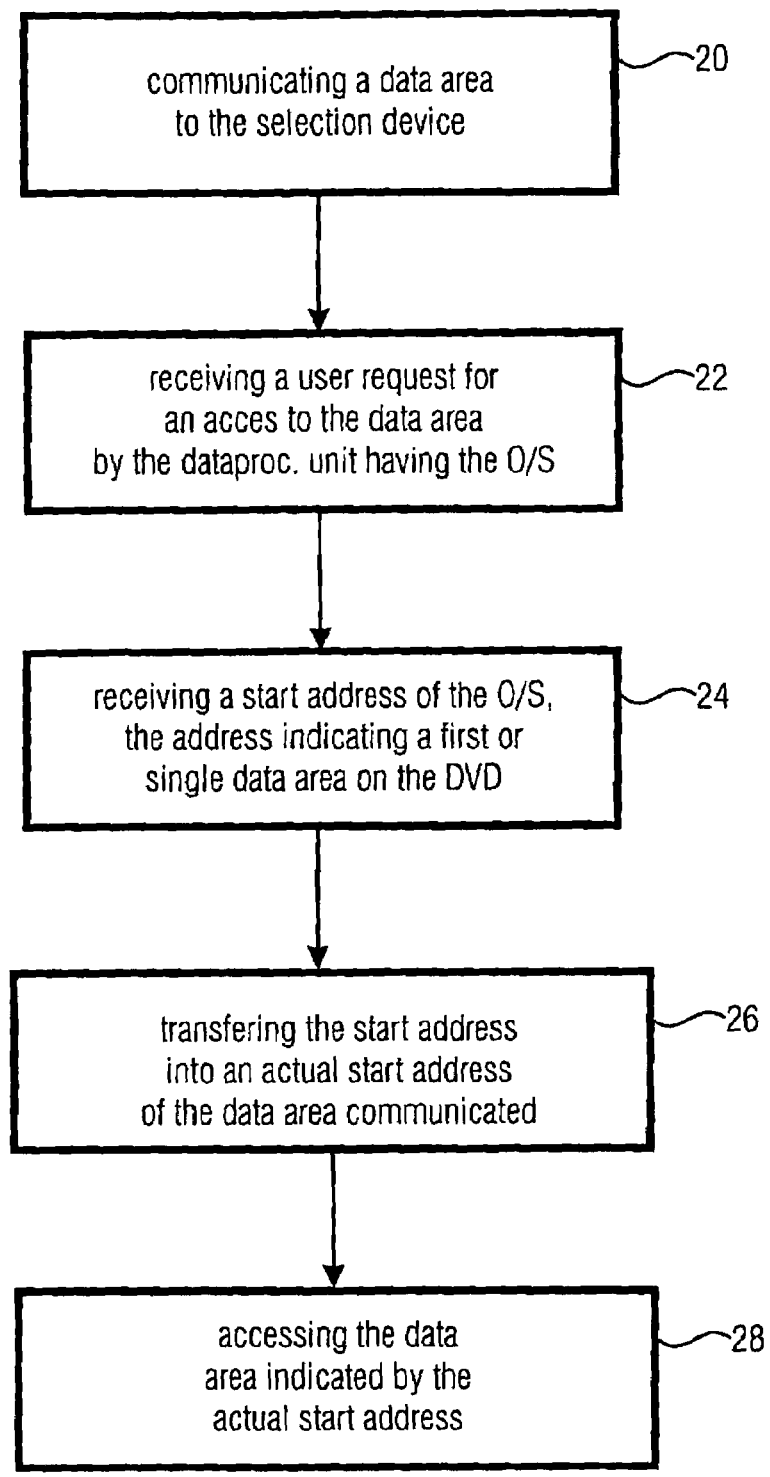
FIG. 1b shows a preferred embodiment of a method for accessing a rewritable Digital Versatile Disk (DVD)
Figure 2A:
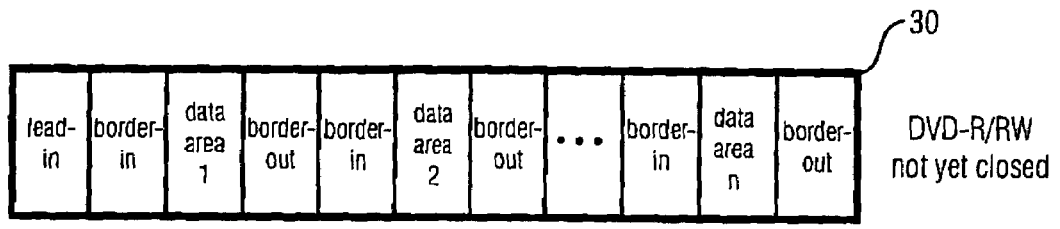
FIG. 2a shows a data structure of a not yet closed DVD–R/RW.
Figure 2B:
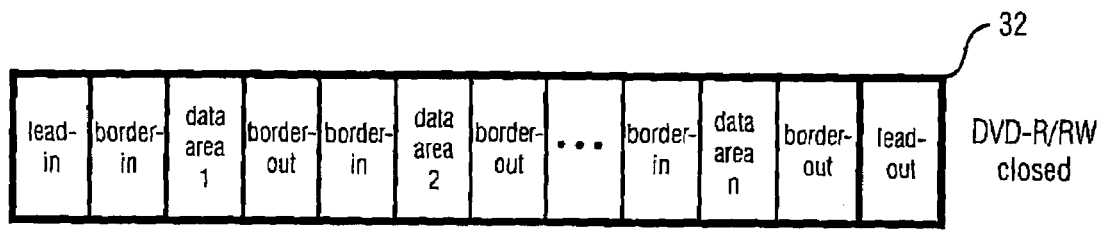
FIG. 2b shows a data structure of a closed DVD–R/RW.

Not yet closed DVD–R/RW's, whereby further data can be recorded as further data areas, have the following structure (FIG. 2):

Lead-In/Border-In/Data Area 1/Border-Out/Border-In/Data Area 2/Border-Out /. . . /Border-In/Data Area n/Border-Out.

A closed DVD-R/RW, whereby no further data can be recorded, has the following structure (FIG. 2b): Lead-In/Border-In/Data Area 1/Border-Out/Border-In/Data Area 2/Border-Out/ . . . /Border-In/Data Area n/Border-Out/Lead-Out.

The first device freely selects a data area, which is characterized by Border-In/Border-Out, is complete and is limited, of the data areas of the DVD–R/RW present after the lead-in during the operation of the DVD–R/RW. The second device represents this data area, which is freely selected during the operation of the DVD and is limited by Border-In/Border-Out, as the first or the only data area of a non-closed or a DVD–R/RW closed by Lead-Out for the operating system.

In a DVD+R, the data area is a component of a so-called "session". A session contains at least for the first session a Lead-In, for the second and the subsequent sessions an Intro, the data area with the user data, for the session n–1 a closure, and for the last session a Lead-Out, in one application or embodiment also with a Closure. A closed DVD+R contains a Lead-Out.

Figure 3A:
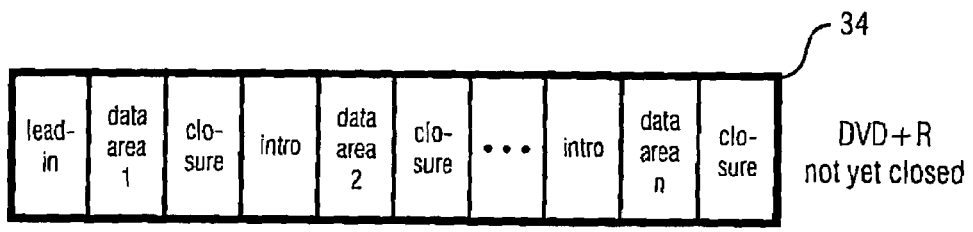
FIG. 3a shows a data structure of a not yet closed DVD+R.

DVD+R's that are not yet closed, whereby still further data can be recorded as a data area, have the following structure (FIG. 3a): Lead-In/Data Area 1/Closure/Intro/Data Area 2/Closure/ . . . /Intro/Data Area n/Closure.

Figure 3B:
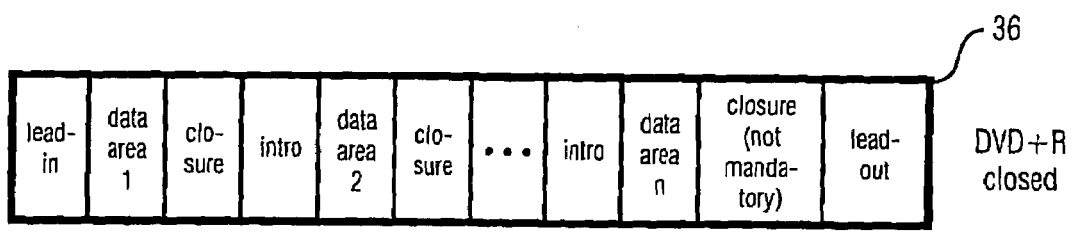
FIG. 3b shows a data structure of a closed DVD+R.

A closed DVD+R, whereby no further data can be recorded, has the following structure (FIG. 3b): Lead-In/Data Area 1/Closure/Intro/Data Area 2/Closure/ . . . /Intro/Data Area n/(Closure—not mandatory)/Lead-Out.

During the operation of the DVD+R, the first device freely selects 20, 22 a data area, which is characterized by Lead-In/Closure or Intro/Closure, is complete and is limited, of the limited data areas of the DVD+R present after the Lead-In. The second device represents this limited data area, which is freely selectable during the operation of the DVD+R on the one hand by Lead-In/Closure or Intro/Closure or on the other hand by Lead-In/Closure, Intro/Closure or Intro/Lead-Out, as the first or the only data area for the operation system.

Not only with the DVD−R/RW, but also with the DVD+R, the second device transfers 26 a start address, for the operating system, of the data area that is the only one selectable for the operating system, to the start address of an arbitrarily selectable data area, whereby the operating system is preset to access the single data area, but whereby the inquiry 24 is diverted to the selected data area 28.

In a further embodiment, a third device records at least one character or a name comprising a plurality of characters for each limited data area into the Lead-In or the Lead-Out in the form of a contents register. The third device is a component of the selection device.

The specification incorporates by reference the disclosure of German priority document DE 102 23 080.3 filed May 17, 2002.

The present invention is, of course, in no way restricted to the specific disclosure of the specification, but also encompasses any modifications within the scope of the appended claims.

The invention claimed is:

1. The selection device for a reading and/or recording device for an inscribable Digital Versatile Disk, wherein the digital Versatile Disk has a plurality of limited data areas, which are present after a Lead-in Area, wherein the selection device is connectable to at least one data processing unit having at least one operating system, wherein the operating system of the data processing unit is preset to be able to access only a limited fixed first or single data area of the plurality of data areas forming a first session, which is present after the Lead-in Area and before a terminating area, and to not access any other data area apart from the limited fixed first or single data area of the plurality of data areas, the other data area being located before or after the terminating area and forming a second session, comprising:
a selector for freely selecting the other data area forming the second session, which is identified, complete and limited and which exists after the terminating area of the Digital Versatile Disk, during an operation of the Digital Versatile Disk (DVD); and
a representer for representing, to the operating system, the other data area forming the second session as the first or the single data area forming the first session so that an operating system access inquiry directed to the other data area selected by the selector, the other data area formina the first sessions is diverted to the second session,
wherein the selector and the representer are connected to each other 2. The selection device according to claim 1,
in which a data area present after the Lead-in Area is limited, on the one hand, by a Border-In Area and, on the other hand, by a Border-Out-Area, and
in which the representer is operative to represent the selected data area limited by the Border-In Area and the Border-Out Area as the first or the single data area for the operating system.

3. Selection device in accordance with claim 1, in which the data area limited by a Border-In Area and a Border-Out Area is present between the Lead-in Area and a Lead-Out Area, and
in which the representer is operative to represent the selected data area limited by the Border-In Area and the Border-Out Area as the first or the single data area for the operating system.

4. Selection device in accordance with claim 1, in which a plurality of data areas limited by Lead-In/Closure-Areas or Intro/Closure Areas are present after the Lead-in Area, and
wherein the representer is operative to represent a data area limited by Lead-In/Closure-Areas or Intro/Closure-Areas as the first or the single data area for the operating system.

5. Selection device in accordance with claim 1, in which the plurality of data areas limited by Lead-In/Closure Areas or Intro/Lead-Out-Areas are present after the Lead-in Area, and
in which the representer is operative to represent the selected data area limited by Lead-In/Closure-Areas, Intro/Closure-Areas or Intro/Lead-Out-Areas as the first or the single data area for the operating system.

6. Selection device in accordance with claim 1, in which the representer is operative for transferring a start address of the first or the single data area only selectable by the operating system to a start address of the selected data area so that the operating system is deceived in that the operating system believes that the operating system accesses the first or single data area, although an access by the operating system to the first or single data area is transferred to the selected data area.

7. Selection device in accordance with claim 1, further comprising:
an inscriber for inscribing at least a single character for each limited data area in the Lead-in Area or a Lead-Out Area, wherein the inscriber is detectable by the operating system.

8. Selection means in accordance with claim 7, in which the inscriber is operative to allocate a freely selectable name to a character for a limited data area.

9. Method of selecting for a reading and/or recording device for an inscribable Digital Versatile Disk, wherein the Digital Versatile Disk has a plurality of limited data areas, which are present after a Lead-in Area, wherein the method is performable in connection with at least one data processing unit having at least one operating system, wherein the operating system of the data processing unit is preset to be able to access only a limited fixed first or single data area of the plurality of data areas forming a first session, which is present after the Lead-in Area and before a terminating area, and to not access any other data area apart from the limited fixed first or single data area of the plurality of data areas, the other data area being located before or after the terminating area and forming a second session, comprising:
freely selecting the other data area forming the second session, which is identified, complete and limited and which exists after the terminating area of the Digital Versatile Disk, during an operation of the Digital Versatile Disk (DVD); and
representing, to the operating system, the other data area forming the second session as the first or the single data area forming the first session so that an operating system access inquiry directed to the first session is diverted to the other data area selected by the selector, the other data area forming the second session.

10. Method of accessing a re-writable Digital Versatile Disk, wherein the Digital Versatile Disk has a plurality of limited data areas after a Lead-in Area, wherein the method is performable with at least one data processing unit having at least one operating system, wherein the operating system of the data processing unit is preset to be capable to access only a limited first or single data area of the plurality of data areas forming a first session, which is present after the Lead-in Area and before a terminating area, and to not access any other data area apart from the limited fixed first or single data area of the plurality of data areas, the other data area being located before or after the terminating area and forming a second session, comprising:

receiving a user communication indicating that the user wishes to access the other data area forming the second session;

representing, to the operating system, the other data area identified by the user as the first or the single data area forming the first session; and diverting an enquiry of the operating system for the first or the single data area forming the first session to the data area identified by the user and forming the second session so that the data area identified by the user and forming the second session is accessed, although the operating system is deceived in that the operating system assumes that the operating system accesses the first or the single data area forming the first session.

11. Method in accordance with claim 10, in which, in the step of representing, a start address of the first or the single data area, which is only selectable by the operating system, is transferred into a start address of the data area identified by the user.

12. Apparatus for accessing a re-writable Digital Versatile Disk, wherein the Digital Versatile Disk has a plurality of limited data areas after a Lead-in Area, wherein the method is performable with at least one data processing unit having at least one operating system, wherein the operating system of the data processing unit is preset to be capable to access only a limited first or single data area of the plurality of data areas forming a first session, which is present after the Lead-in Area and before a terminating area, and to not access any other data area apart from the limited fixed first or single data area of the plurality of data areas, the other data area being located before or after the terminating area and forming a second session, comprising:

a receiver for receiving a user communication indicating that the user wishes to access the other data area forming the second session;

a representer for representing, to the operating system, the other data area identified by the user as the first or the single data area forming the first session; and a diverter for diverting an enquiry of the operating system for the first or the single data area forming the first session to the data area identified by the user and forming the second session so that the data area identified by the user and forming the second session is accessed, although the operating system is deceived in that the operating system assumes that the operating system accesses the first or the single data area forming the first session.

* * * * *